United States Patent Office 3,119,863
Patented Jan. 28, 1964

3,119,863
AMINODIBORON COMPOUNDS AND METHOD
FOR MAKING SAME
Robert J. Brotherton, Fullerton, Calif., assignor to United States Borax & Chemical Corporation, Los Angeles, Calif., a corporation of Nevada
No Drawing. Filed Aug. 22, 1960, Ser. No. 50,860
4 Claims. (Cl. 260—551)

The present invention relates as indicated to aminodiboron compounds and has particular reference to sym-dialkyl or diaryl-bis(dialkyl or diarylamino)diborons and a method for making same.

The products of the present invention are a new class of stable diboron compounds with trigonal ($SP^2$) coplanar bonding, and are extremely useful chemical intermediates for the preparation of a variety of other organoboron compounds. They can be prepared in substantially pure form in conventional apparatus by the present process, which is rapid, efficient and economically desirable.

It is therefore the principal object of this invention to provide new stable aminodiboron compounds.

It is a further object of the present invention to provide a method for making these compounds which is efficient and economically desirable.

Other objects of the invention will appear as the description proceeds.

To the accomplishment of the foregoing and related ends, said invention then comprises the features hereinafter fully described and pointed out in the claims, the following description setting forth in detail certain illustrative embodiments of the invention, these being indicative, however, of but a few of the various ways in which the principle of the invention may be employed.

Broadly stated, the present invention comprises the method of making symmetrical aminodiboron compounds having the general formula

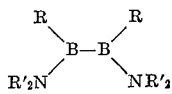

which comprises reacting a compound having the general formula

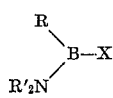

with a metal having a continuously clean active surface, said metal selected from the group consisting of the alkali metals, sodium-potassium alloys and sodium amalgam, where R and R' are radicals selected from the group consisting of alkyl radicals having from 1–6 carbon atoms, phenyl, naphthyl and substituted phenyl the substituents selected from the group consisting of phenyl and alkyl and alkoxy radicals having from 1–6 carbon atoms.

It will be noted from the foregoing broadly stated paragraph the R and R' groups of the aminohaloborane reactant can be the same or different.

The following list is a partial enumeration of the alkyl and/or aryl aminohaloboranes applicable to the present invention:

Chloro(dimethylamino)methylborane
Chloro(dimethylamino)ethylborane
Chloro(diethylamino)ethylborane
Chloro(di-n-propylamino)phenylborane
Chloro(diisopropylamino)phenylborane
Chloro(di-sec-amino)phenylborane
Chloro(diphenylamino)phenylborane
4-biphenyl-bromo(dimethylamino)borane
p-Anisyl-bromo(di-n-amylamino)borane
p-Anisyl-bromo(diisoamylamino)borane
Bromo-p-ethylphenyl(diphenylamino)borane
Bromo-(diethylamino)-p-ethoxyphenylborane
Fluoro-(di-n-propylamino)-p-isobutoxyphenylborane
Bromo-(di-p-anisylamino)ethylborane
Iodo-(diisobutylamino)-p-ethylphenylborane
Iodo-(dimethylamino)-1-naphthylborane These materials can be obtained if desired from the reaction of a dihaloaliphatic, or aromatic borane with a secondary aliphatic or aromatic amine and the reaction of this resultant mass with a tertiary amine.

As for the metal reactant of the present process, it will be noted that the metal is specifically described as having a continuously available clean active surface. This is of the utmost importance in order for the reaction to proceed and to obtain a maximum yield. To have a continuously available clean active surface the metal must be either dispersed in a very small particle size or in a liquid or molten condition. Thus in effect it is necessary to have the metal in such a physical state where it presents a maximum surface area and which provides a continuously available clean active surface for reaction.

So that the present invention is more clearly understood, the following examples are given for illustrative purposes:

I

A solution of 30.67 grams (0.26 mole) of chloro(dimethylamino)ethylborane in 50 ml. of mineral oil was added at room temperature to a previously prepared dispersion which contained 80 grams (0.35 mole) of sodium in 350 ml. of mineral oil. The mixture was heated slowly with stirring at 120° C. to 125° C. and stirred at this temperature for 5 hours. The solid sodium-sodium chloride mixture was removed by filtration and the filtrate distilled to yield sym-bis(dimethylamino)diethyldiboron.

Chemical analysis yielded the following results: Calculated for $C_8H_{22}B_2N_2$: B=12.9%; C=47.1%; H=13.1%; mol. wt.=168. Found in product: B=12.7%; C=47.2%; H=13.3%; mol. wt.=167.

II

A mixture of 10.2 grams (0.26 mole) of potassium in 350 ml. of xylene was refluxed with vigorous agitation. 33.5 grams (0.20 mole) of chloro(dimethylamino)phenylborane in 50 ml. of xylene was added and the reaction mixture was heated at reflux for 2 hours. The solid potassium-potassium chloride was filtered off and xylene was removed from the filtrate at reduced pressure and sym-bis(dimethylamino)diphenyldiboron was recovered.

Chemical analysis yielded the following results: Calculated for $C_{16}H_{22}B_2N_2$: B=8.19%; C=72.8%; H=8.3%; mol. wt.=264. Found in product: B=8.14%; C=72.4%; H=8.53%; mol. wt.=263.

III

A mixture of 8.0 grams (0.35 mole) of sodium in 350 ml. of xylene was refluxed with vigorous agitation. A solution of 74.1 grams (0.26 mole) bromo(diethylamino)-p-ethoxyphenylborane in 50 ml. of xylene was added and the reaction mixture was heated at reflux for 2 hours. The solid sodium-sodium chloride was filtered, xylene was removed from the filtrate at reduced pressure and sym-bis(diethylamino)-di(p-ethoxyphenyl)diboron was recovered.

Chemical analysis yielded the following data: Calculated for $C_{24}H_{40}B_2N_2O_2$: B=5.28%; C=70.2%; H=9.74%; mol. wt.=410. Found in product: B=5.20%; C=70.0%; H=9.96%; mol. wt.=408.

IV

Example I was repeated except sodium-potassium alloys were used as the active metal. The alloys used included 6 to 1 and 3 to 1 potassium to sodium weight ratios. The results were comparable with Example I.

The products of the present invention as noted previously are useful chemical intermediates for the preparation of a variety of other organoboron compounds. These compounds also have utility as corrosion inhibitors in cooling and heat exchange systems. For example, the present compounds when put into glycolic antifreeze solutions give the antifreeze solutions remarkably improved corrosion properties. The following example is illustrative of a glycol antifreeze containing one of the compounds of the present invention:

| | Percent |
|---|---|
| Sym-bis(dimethylamino)diethylboron | 3.0 |
| Mercaptobenzothiazole | 0.1 |
| Sodium metasilicate | 0.1 |
| Ethylene glycol | 96.8 |

Other modes of applying the principle of the invention may be employed provided the features stated in any of the following claims or the equivalent of such be employed.

I, therefore, particularly point out and distinctly claim as my invention:

1. The symmetrical aminodiboron compounds having the formula

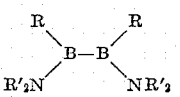

where R and R' are selected from the group consisting of alkyl of 1–6 carbon atoms, phenyl, naphthyl and substituted phenyl the substituents selected from the group consisting of phenyl, alkyl of 1–6 carbon atoms and alkoxy of 1–6 carbon atoms.

2. Sym-bis(dimethylamino)diethyldiboron.
3. Sym-bis(dimethylamino)diphenyldiboron.
4. Sym-bis(diethylamino)-di(p-ethoxyphenyl)diboron.

References Cited in the file of this patent

UNITED STATES PATENTS 2,974,165     Brotherton et al. _____ Mar. 15, 1961